US011941574B2

(12) United States Patent
Haque

(10) Patent No.: US 11,941,574 B2
(45) Date of Patent: Mar. 26, 2024

(54) TRIP SCHEDULING SYSTEM

(71) Applicant: DriverDo LLC, Overland Park, KS (US)

(72) Inventor: Mashhur Zarif Haque, Lawrence, KS (US)

(73) Assignee: DriverDo LLC, Overland Park, KS (US)

( * ) Notice: Subject to any disclaimer, the term of this patent is extended or adjusted under 35 U.S.C. 154(b) by 0 days.

(21) Appl. No.: 18/320,310

(22) Filed: May 19, 2023

(65) Prior Publication Data

US 2023/0289711 A1     Sep. 14, 2023

Related U.S. Application Data

(63) Continuation of application No. 17/506,938, filed on Oct. 21, 2021, now Pat. No. 11,694,151, which is a continuation of application No. 17/381,618, filed on Jul. 21, 2021, now Pat. No. 11,562,316, which is a continuation of application No. 16/417,920, filed on May 21, 2019, now Pat. No. 11,100,451, which is a continuation of application No. 15/010,039, filed on Jan. 29, 2016, now Pat. No. 10,304,027.

(51) Int. Cl.
*G06Q 50/30*     (2012.01)
*G06Q 10/0833*   (2023.01)
*G06Q 40/08*     (2012.01)

(52) U.S. Cl.
CPC ......... *G06Q 10/0833* (2013.01); *G06Q 40/08* (2013.01); *G06Q 50/30* (2013.01)

(58) Field of Classification Search
CPC ............... G06Q 10/08; G06Q 10/0833; G06Q 10/08355
USPC ....................................................... 705/1.1, 4
See application file for complete search history.

(56) References Cited

U.S. PATENT DOCUMENTS

| | | | |
|---|---|---|---|
| 10,467,580 B1 * | 11/2019 | Davidson | G06Q 10/08355 |
| 2008/0021756 A1 * | 1/2008 | Kesavan | G06Q 30/0645 |
| | | | 705/330 |
| 2013/0258110 A1 * | 10/2013 | DeMarco | G08B 25/14 |
| | | | 340/517 |
| 2015/0039362 A1 * | 2/2015 | Haque | G06Q 10/0631 |
| | | | 705/7.12 |
| 2015/0278759 A1 * | 10/2015 | Harris | G06Q 10/08355 |
| | | | 705/338 |
| 2015/0310379 A1 * | 10/2015 | Farrelly | G06Q 30/0203 |
| | | | 705/7.15 |

(Continued)

OTHER PUBLICATIONS

Centralized bundle generation in auction-based collaborative transportation Margaretha Gansterer1f)• Richard F. Hartl1 (Year: 2018).*

*Primary Examiner* — William E Rankins
(74) *Attorney, Agent, or Firm* — Erise IP, P.A.

(57) ABSTRACT

Media, method and system for scheduling trips, and particularly for scheduling trip to transport vehicles from a pick-up location to a drop-off location. To accomplish this, interfaces are provided for describing the desired starting and ending locations for vehicles and automatically allocating drivers to vehicles for each segment of a desired trip and assigning any necessary tasks to the drivers to complete for each waypoint of the trip. Additionally, any other requirements for transporting the vehicles, such as insurance and temporary license plates, can automatically be provided for.

22 Claims, 6 Drawing Sheets

(56) References Cited

U.S. PATENT DOCUMENTS

2016/0071056 A1* 3/2016 Ellison ............. G06Q 10/08355
 705/338
2016/0104111 A1* 4/2016 Jones ................. G06Q 30/0611
 705/26.4
2016/0334230 A1* 11/2016 Ross ................. G01C 21/3415

* cited by examiner

FIG. 3

TRIP SCHEDULING SYSTEM

RELATED APPLICATIONS

This is a continuation of U.S. patent application Ser. No. 17/506,938, filed Oct. 21, 2021, entitled "TRIP SCHEDULING SYSTEM," which is a continuation of U.S. patent application Ser. No. 17/381,618, filed Jul. 21, 2021, now U.S. Pat. No. 11,562,316, issued Jan. 24, 2023, entitled "TRIP SCHEDULING SYSTEM," which is a continuation of U.S. patent application Ser. No. 16/417,920, filed May 21, 2019, now U.S. Pat. No. 11,100,451, issued Aug. 24, 2021, entitled "TRIP SCHEDULING SYSTEM," which is a continuation of U.S. patent application Ser. No. 15/010,039, filed Jan. 29, 2016, now U.S. Pat. No. 10,304,027, issued May 28, 2019, entitled "TRIP SCHEDULING SYSTEM." The disclosures of the above-referenced patents and patent applications are hereby incorporated by reference in their entirety.

This non-provisional patent application shares certain subject matter with earlier-filed U.S. patent application Ser. No. 13/987,495, filed Jul. 31, 2013, and entitled "MOBILE APPLICATION FOR AUTOMOBILE BUSINESS TO MANAGE DRIVER-BASED TRANSPORTING OF VEHICLES," U.S. patent application Ser. No. 14/084,380, filed Nov. 19, 2013, now U.S. Pat. No. 10,181,104, issued Jan. 15, 2019, and entitled "ALLOCATION SYSTEM AND METHOD OF DEPLOYING RESOURCES," and U.S. patent application Ser. No. 14/485,367, filed on Dec. 17, 2014, now U.S. Pat. No. 9,902,343, issued Feb. 27, 2018, and entitled "DIGITAL VEHICLE TAG AND METHOD OF INTEGRATION IN VEHICLE ALLOCATION SYSTEM." The identified earlier-filed patents and patent applications are hereby incorporated by reference in their entirety into the present application.

BACKGROUND

1. Field

Embodiments of the invention generally relate to scheduling trips for transporting vehicles (or other goods) from one location to another and, more particularly, to methods and interfaces for allocating drivers to vehicles and assigning tasks to be completed for each segment of the journey.

2. Related Art

Traditionally, transportation of vehicles between locations (for example, from the auction where they are purchased to a dealership for resale) have been transported either by car carrier or by employing a driver to travel to the pickup location and drive the vehicle to the drop-off location. In the latter case, the driver must be transported to the pickup location and from the drop-off location, typically by a second driver in a chase car. However, this leads to inefficiencies as two drivers are required and the total distance traveled is typically at least twice the distance from the pickup point to the drop-off point. Particularly in the case where many vehicles must be transported from a variety of pickup points to a variety of destinations, such inefficiencies can be prohibitively expensive in terms of time and costs. Accordingly, there is a need for a system that can automatically schedule drivers for trips between locations so as to minimize the distance, drivers, and time needed to minimize the overhead costs.

SUMMARY

Embodiments of the invention address the above-described need by providing methods and interfaces for describing the desired starting and ending locations for vehicles and automatically allocating drivers to vehicles for each segment of a desired trip and determining any needed chase car capacity for the trips. In a first embodiment, the invention includes one or more non-transitory computer-readable media storing computer-executable instructions that, when executed by a processor, perform a method of displaying an interface for a trip-scheduling system, the method comprising the steps of displaying a destination selection page operable to receive input of a plurality of locations from a user, displaying a vehicle selection page operable to receive input of an indication of a vehicle to be transported, displaying a trip overview page operable to receive a selection of a pick-up location for the vehicle from the plurality of locations and a drop-off location for the vehicle from the plurality of locations, determining a driver from a pool of available drivers to drive the vehicle from the pick-up location to the drop-off location; and updating the trip overview page to reflect the driver driving the vehicle from the pick-up location to the drop-off location.

In a second embodiment the invention includes a method of scheduling a trip, comprising the steps of displaying a destination selection page operable to receive input of a plurality of locations from a user, displaying a vehicle selection page operable to receive input of an indication of a vehicle to be transported, receiving an indication of a first vehicle to be transported from a first pick-up location of the plurality of locations to a first drop-off location of the plurality of locations, receiving an indication of a second vehicle to be transported from a second pick-up location of the plurality of locations to a second drop-off location of the plurality of locations, determining a first driver to transport the first vehicle from the first pick-up location to the first drop-off location, determining a second driver to transport the second vehicle from the second pick-up location to the second drop-off location, displaying a trip overview page including the first pickup location, the first drop-off location, the first driver, the second pick-up location, the second drop-off location, and the second driver.

In a third embodiment, the invention includes a system for scheduling trips, comprising a first server, operable to provide a destination selection page operable to receive input of a plurality of locations from a user, a vehicle selection page operable to receive input of an indication of a vehicle to be transported, a trip overview page operable to receive a selection of a pick-up location for the vehicle from the plurality of locations and a drop-off location for the vehicle from the plurality of locations, wherein the trip overview page is operable to display a real-time-updated view of the driver driving the vehicle from the pick-up location to the drop-off location; and a client device operable to provide a driver interface showing a task list showing at least one task to be performed by the driver for the vehicle at a location of the plurality of locations This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 3 depicts a vehicle information page of the trip creation interface in accordance with embodiments of the present invention

Figure 1:
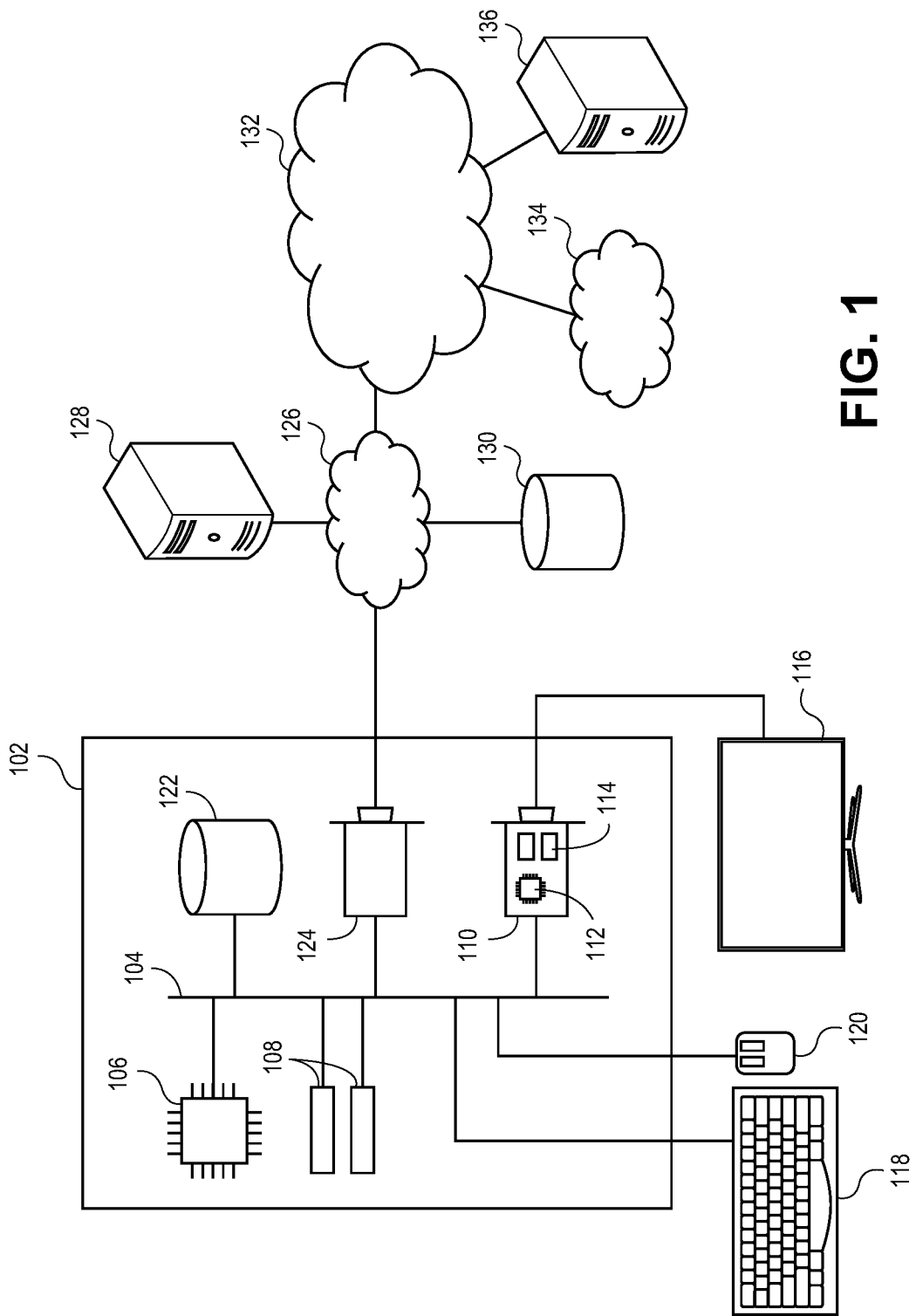
FIG. 1 depicts an exemplary hardware platform that for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention create a schedule, itinerary, and allocation of drivers among the vehicles (or other assets) to be transported such that the fewest number of drivers and the least amount of time is required. For example, if three cars are to be picked up from an auction, two to be transported to a first dealership and the third to a second dealership, then the system might schedule a four-passenger chase car with a driver to transport three other drivers to the auction, allocate a driver to each vehicle to be driven, and then route the chase car to follow the two cars to the first dealership and then to the second dealership to lick up the third driver. Alternately, if it is more efficient, all three cars might travel in a convoy to the first dealership, drop off the first two vehicles and transfer their drivers to the chase vehicle, and then the third vehicle and the chase car travel together to the second dealership to drop off the third car. Although this specification describes the invention with respect to transporting vehicles, it will be appreciated that embodiments of the invention can include other forms of transportation including transportation of passengers or goods. Broadly, the invention is applicable to any industry that can increase efficiencies by having a third party transport their goods.

In order to determine which of these options for the trip is more efficient, the requester of the trip must identify each of the locations where a vehicle or driver is to be picked up or dropped off, together with which vehicles are to be picked up or dropped off there. In addition, tasks for the drivers may be required at each location for the vehicle being picked up or dropped off there. Once the set of vehicles and locations had been specified, the driver routes can be determined, and individual drivers can be assigned to each driver route. Depending on the requestor's preferences, the driver routes may be selected to minimize the number of required drivers, the total trip time, or the costs to pay the drivers.

More generally, embodiments of the invention as described above can be combined with the other concepts disclosed in this specification and the related applications incorporated above to form an integrated trip management system. In particular, if a driveaway company previously wished to transport a vehicle, the driveaway company would need to make separate arrangements for each vehicle for a driver, for a temporary or dealer license plate, and for any needed insurance.

Embodiments of the invention allow a user to simply specify vehicles and locations for pick-up and drop-off for each vehicle. The system can then automatically allocate the trip segments for each vehicle among a driver pool, contact drivers to alert them to the trip, and manage driver payment and reimbursement. The system can then automatically interact with the state motor vehicle registry to obtain temporary licensing information for each vehicle and transmit it to a digital license plate to be installed on the vehicle. The system can also interact with one or more insurance providers to obtain commercial by-the-trip insurance for the vehicle to protect the vehicle against loss and provide policy information to the driveaway company and/or the driver.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Turning first to FIG. 1, an exemplary hardware platform that for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and non-removable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Embodiments of the Invention in Operation

Figure 2:
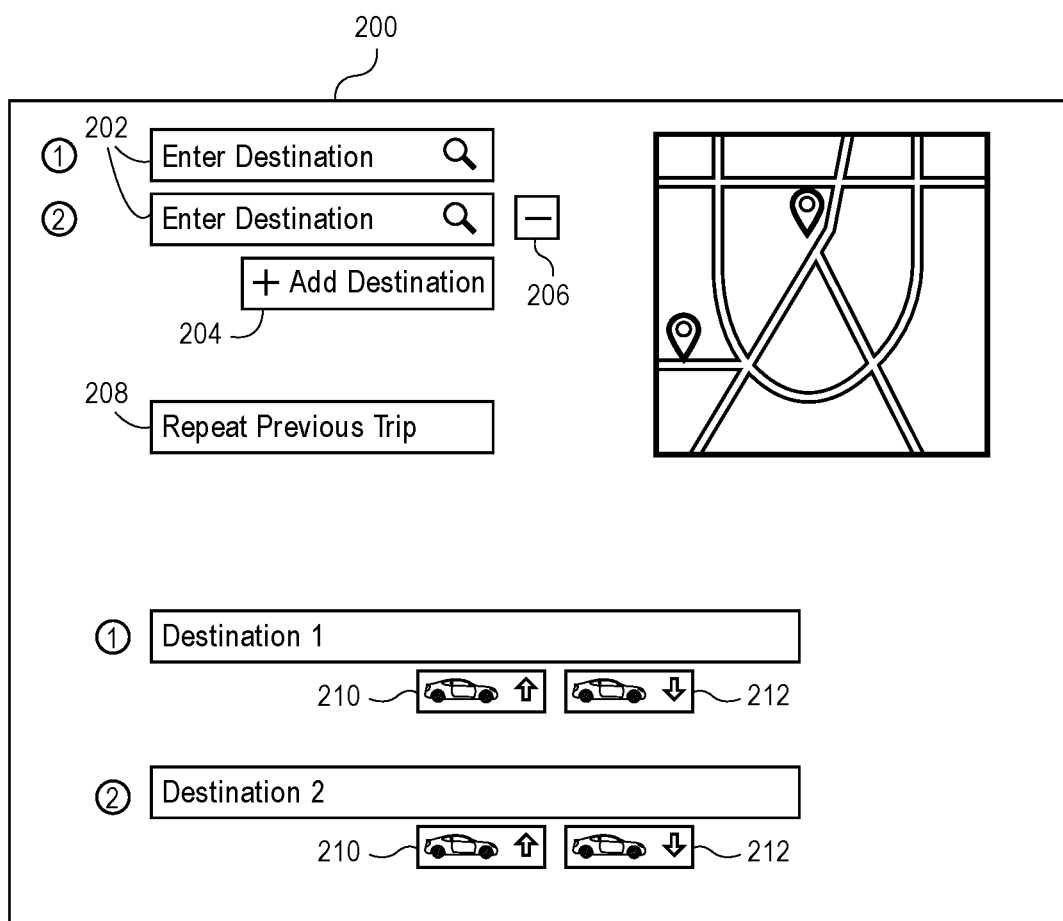
FIG. 2 depicts a destination selection page of the trip creation interface suitable for use with embodiments of the invention.

Turning now to FIG. 2, a destination selection page of the trip creation interface suitable for use with embodiments of the invention is depicted, and referred to generally by reference numeral 200. In some embodiments of the invention, the destination selection page of the trip creation interface is the first page presented to a trip requestor. In other embodiments, the requestor is first presented with a preliminary page to specify the timing of the trip, the type or purpose of the trip (e.g., transporting vehicles, transporting other goods, or transporting passengers) or other trip parameters. Page 200 allows the user to specify the destinations that make up the trip in a variety of ways. For example, the user can enter an address in destination box 202. Alternatively, the user can enter a business name or other search term in description box 202. In some embodiments, the user can instead select the destination on a mapping interface. In some embodiments, past destinations (however specified) are prepopulated for easy selection. For example, in the mapping interface embodiment, previously selected destinations may appear as push-pins in the map that can be clicked to re-select that destination. In other embodiments, previously selected destinations may appear in drop-down menus or be autocompleted as the user types. In some embodiments, users may be given the option of providing human-readable names for destinations specified by geographic coordinates (e.g., those locations specified by clicking on a map). Such human-readable locations may later be provided by driver to aid in locating the pick-up or drop-off point. A person of skill in the art will appreciate that many ways of specifying a destination can be employed, and all such ways, now know or later developed, are contemplated.

A trip broadly comprises an ordered set of two or more destinations. As such, in some embodiments, two destination boxes 202 are provided, together with an "add destination" button 204, which causes an additional destination box 202 to be added to page 200. In this way, a user can specify any number of destinations for the trip. Additional controls for controlling the destinations making up the trip may also be provided. For example, a "delete destination" button 206 may be provided to remove a destination box 202 which was added in error or is no longer needed. In some embodiments, provision may be made for the destinations of a trip to be re-ordered, such as "move destination up" and "move destination down" buttons, or the ability to drag and drop destinations to new locations in the list of destinations. In addition, lists of destinations can be saved and recalled for future trips. In some embodiments, an explicit command to save a list of destinations may be provided to the user. In other embodiments, the list of destinations may be saved every time the user creates a trip and made available for easily creating the list of destinations in a subsequent trip. For example, a "repeat previous trip" 208 button may be provided to the user, and allow any previous trip to be selected, or new trips created by learning from previously created trips. Alternatively, the user may be prompted with similar trips when they begin entering destinations in the list of destinations. Similarly, some embodiments may include a "save trip" button to allow a user to postpone completion of a partially created trip for later.

A trip, as the term is used herein further broadly comprises zero or more vehicles (or other assets) to be picked up at each destination and zero or more vehicles to be dropped off at each destination. Some destinations may have vehicles both picked up and dropped off, some destinations may have only one or the other, and some destinations may be purely waypoints with no vehicles picked up or dropped off. Trips may aggregate activities for a single client (e.g., service trips, parts delivers, and vehicle sales) for a single client, aggregates activities across clients (e.g., driveaway orders from auctions, dealers, rental car companies, and manufacturers), or both. Correspondingly, vehicles may have distinct pick-up location and/or distinct drop-off locations. To specify this, the page 200 may provide "pick up vehicle" button 210 and "drop off vehicle" button 212. When specifying a vehicle to be picked up, the user may be prompted to enter information identifying the vehicle (as described in greater detail below), and when specifying a vehicle to be dropped off, the user may be presented with a list of vehicles which have been previously specified to select from. In other embodiments, buttons 210 and 212 are combined into a single "add vehicle" which allows the vehicle data to be provided together with the pick-up and drop-off locations for that vehicle. Once the vehicles and destinations have been specified by the user, processing can proceed to page 400, as described below. In some embodiments, special instructions or notes can be added for particular vehicles at either pickup or destination, either by the trip requestor or the driver. For example, the trip requestor could include a gate code or vehicle bay number where the car is to be picked up or dropped off; similarly, the driver could indicate that damage is present when the vehicle is picked up or that the color for the vehicle does not match the description given.

Figure 3:
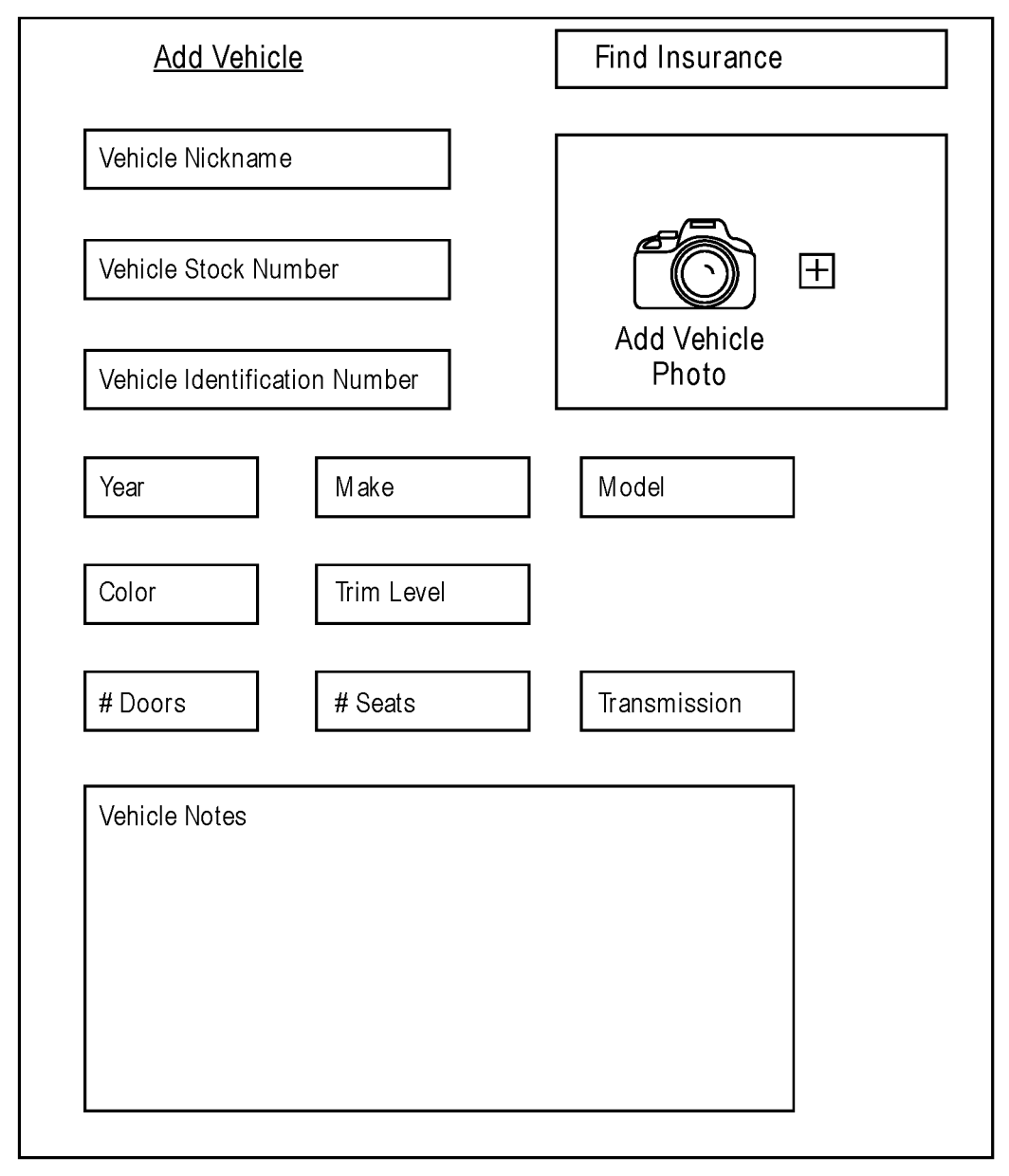

Turning now to FIG. 3, a vehicle information page in accordance with embodiments of the present invention is depicted, and referred to generally by reference numeral 300. In some embodiments, page 300 is presented to the user when adding a vehicle to a trip on page 200. In other embodiments, the user has a separate vehicle inventory page from which to select vehicles for adding to trips, and page 300 is available to add vehicles to the vehicle inventory. A variety of information about the vehicle can be provided on page 300 in order to enable the driver to locate the vehicle when it is picked up, or for other purposes. As depicted, information about the car can include an inventory stock number, the Vehicle Identification Number (VIN), the year, make, model, color and trim level of the car may be included. In other embodiments, other information (such as, for example, the vehicle's number of doors or seats, or the type of transmission) may be included instead or in addition. In some embodiments, a free-form "notes" field may also be included to record information such as damage to the vehicle or special instructions to the driver of the vehicle. In some such embodiments, multiple such "notes" fields can be present for the requestor and driver to each add their own information about the vehicle. As discussed below, certain vehicles may require additional qualifications for drivers, which may also be noted in page 300.

In some embodiments, the invention may be further operable to automatically obtain by-the-trip insurance for each vehicle being transported. The price of such a by-the-trip policy may depend on the vehicle, the driver, the distance and time the vehicle is being transported, and/or other factors. All the information necessary to obtain such a policy can be automatically be transmitted to one or more insurance providers once is has been provided by the user (or automatically determined based on user-provided information). A policy can then be selected from those provider willing to insure each vehicle based on the price of the policy, coverage of the policy and/or other factors. One of skill in the art will appreciate that different insurance providers may be selected for different vehicles being transported during the same trip for any of a variety of reasons. The by-the-trip insurance can be funded by the operators of the system, or split among all interested parties for each vehicle. This information can be provided to the drivers, once they have been determined, in any convenient form, such as (for example) the driver interface discussed below.

Similarly, some embodiments of the invention may automatically determine temporary license plate information for the vehicles being transported. For example, the system may interface with a state registrar of motor vehicles to provide the necessary information to obtain a temporary license plate number. Information required could include the identity of the vehicle, the identity of the owner of the vehicle during transit, insurance information (which may be by-the-trip, as described above), and other information. Once the temporary license plate information is received from the state, it can be associated with the vehicle in any of a number of ways. For example, temporary license plates can be printed and provided to the drivers before they pick up the vehicles. In other embodiments, the temporary license plate information is provided digitally to the drivers and never displayed on the vehicle itself. In still other embodiments, the temporary license plate information can be transmitted to a digital license plate mountable on the vehicle, either directly or as relayed to or input into the plate by the drivers. Such digital license plates can then display the temporary license plate information using any known display technology (for example, e-ink or a liquid crystal display). In some embodiments, the digital license plates automatically stop displaying the temporary license plate information when it expires; i.e., when the trip is scheduled to end.

In some embodiments, additional licensing information can be obtained and displayed in a similar fashion. For example, Department of Transportation (DOT) numbers can be electronically obtained and displayed on a digital placard, either attached to the side of the truck via magnets, or hung on the glass of the truck. Similarly, temporary aircraft registration numbers can be obtained and displayed when transporting aircraft.

Figure 4:
FIG. 4 depicts a driver selection page of the trip creation interface in accordance with embodiments of the invention.

Turning now to FIG. 4, a driver selection page is depicted in accordance with embodiments of the invention, and referred to generally by reference numeral 400. Page 400 allows a user to allocate drivers to each of the vehicles to be transported for each segment of the trip. Initially, the number of drivers required is determined. In some embodiment, the number of drivers required is the maximum number of vehicles being simultaneously transported for an individual segment across all of the segments making up the trip. In other embodiments, the number of drivers is this maximum number of vehicles plus an additional driver for the chase car (i.e., the vehicle used to transport the other drivers to the initial pick-up point and/or from the final drop-off point). In still other embodiments, the user can specify whether a chase vehicle is to be used or whether alternative transportation (such as a taxi, a limousine service or a car-sharing service such as Uber) is to be used, and the number of drivers is calculated based on this information. Additionally, chase car capacity may be taken into account when calculating the needed number of drivers. For example, if eight drivers are needed for a given trip but the chase car has a capacity of only four drivers, then an additional chase car (with accompanying driver) may be needed.

Once the number of drivers needed has been calculated by the system, the driver can be chosen and assigned to vehicles for each trip segment. In some embodiments, the drivers can be selected automatically from a pool of available drivers. For example, a "Choose For Me" button may be present which automatically selects drivers for one or more slots.

For example, drivers previously chosen for the most trips may be selected, or drivers from the user's list of preferred drivers. Drivers may be chosen based on their proximity to the pick-up or drop-off locations (e.g., only drivers within a particular (potentially population-density-dependent) radius of the pick-up or drop-off location might be eligible for automatic selection). In some embodiments, the locations of drivers (and their self-reported availability) can be monitored in real time using the GPS functionality of their smartphones on which an app is installed to interoperate with the system. In some embodiments, the most qualified (e.g., the most experienced) driver is automatically selected for the lead driver slot. Generally the lead driver drives the chase car (if one is used) and has additional supervisory tasks on their task list, as described further below. In some embodiments, drivers can self-organize (or be organized by the system) into driver teams that can be assigned as a unit. In some such embodiments, and additional button may be present in page 400 to assign all drivers form a drive team.

In other embodiments, the user can manually specify drivers for each vehicle and segment. In still other embodiments, the system can provide a preliminary assignment or drivers for the user to revise or approve as desired. In those embodiments where the system assigns driver automatically, a variety of factors may be taken into consideration. First, as discussed in greater detail below, drivers can specify their availability for trips. Thus, if the user specifies that the trip is to take place at a time when a particular driver has indicated that they are unavailable, then that driver will not be selected. In still other embodiments, where a vehicle supports self-driving capabilities, the vehicle may be set to "transport mode" and no driver need be assigned to that vehicle. In such embodiments, a single lead driver may be able to manage a large number of vehicles in transport mode.

In some embodiments, driver and/or destination changes can be made on-the-fly using interface 400. For example, if a driver becomes ill in the course of an extended trip, the user can add new destinations to drop off the ailing driver, pick up a replacement driver, and reallocate the trip segments from the ailing driver to the replacement driver. Similarly, the driver can add additional segments to the end of a trip if additional vehicle are located to be transported from the previously final destination. In some embodiments, where long-distance transportation (e.g., airplane or train tickets) from the final destination back to the initial pick-up point has been arranged, adding additional segments can automatically rebook this transportation. When drivers and/or destinations are added, deleted, or changed, the action sheets for the drivers can be automatically updated to reflect the new set of tasks required of each driver.

Similarly, the trip requestor or governmental regulation may specify that certain vehicles require particular certifications (e.g., a specific class of driver's license) to drive, and only those drivers which have that credential will be considered. As well, requestors may prefer their own drivers, or drivers with whom they have previous experience. Such drivers can be selected preferentially, with a general pool of drivers selected only if the preferred drivers are exhausted. For some trips, multiple drivers may be assigned to a single vehicle where, for example, a driver drops off a first vehicle then rides with another driver in the second vehicle to pick up the third vehicle. As such the system can calculate the number of drivers that can fit in each vehicle so that vehicles being transported can double as additional chase cars when needed.

The distances between the waypoints of the trip, the certifications required of the drivers, and/or the total trip time can be used to suggest bids for drivers as needed. Some drivers may be employees of the trip requestor, and thus not require additional payment for the trip; this may be taken into account when selecting drivers. However, independent contractors or other by-the-trip drivers may be paid based on the details of the trip. Such payment can be structured as a flat fee for a particular trip, a per-mile rate or an hourly rate. One of skill in the art will appreciate that other payment structures or combinations of payment structures can also be offered. Where the user desires to offer a flat rate, the system can suggest a rate based on time and/or distance to avoid requiring the driver to record actual time and mileage traveled. Similarly, if the user has a desired hourly rate, the system can convert this to a flat rate or per-mile rate for the trip. Suggested bids for a driver can also be suggested based on the particular driver's history of accepted and rejected bids or other factors (e.g., an applicable minimum wage). The user can also override any of these suggestions to provide their own bids for drivers as desired. Where applicable, the driver's mobile interface, as discussed below, can track the actual distance traveled and the time spent actually driving for compensation purposes.

Once the initial set of drivers has been determined, requests can be sent to the selected drivers requesting that they drive for the trip. These requests can be sent by any form of communication now known or later developed, including phone calls, email, SMS or MMS message, or push notifications. Because not all drivers may be available for a given trip (regardless of their advertised availability), some embodiments may require that a driver acknowledge such requests within a predetermined period of time. For example, a driver may be required to agree to a request within fifteen minutes or the request may be automatically cancelled. The form of such an acknowledgement may depend on the form of the request. For example, if automated telephone calls are used to notify drivers, drivers may be able to indicate their ability (or inability) to driver for the trip by using touch-tone responses from their telephone. Similarly, if an in-app push notification is provided, then users may be able to respond using buttons provided by the app. In embodiments where a response is required but one or more drivers responds in the negative (or does not respond at all), new drivers may be automatically selected from the available pool and request transmitted to them. This process can be continued until all driver roles have been filled with driver who are available for the trip.

Figure 5:
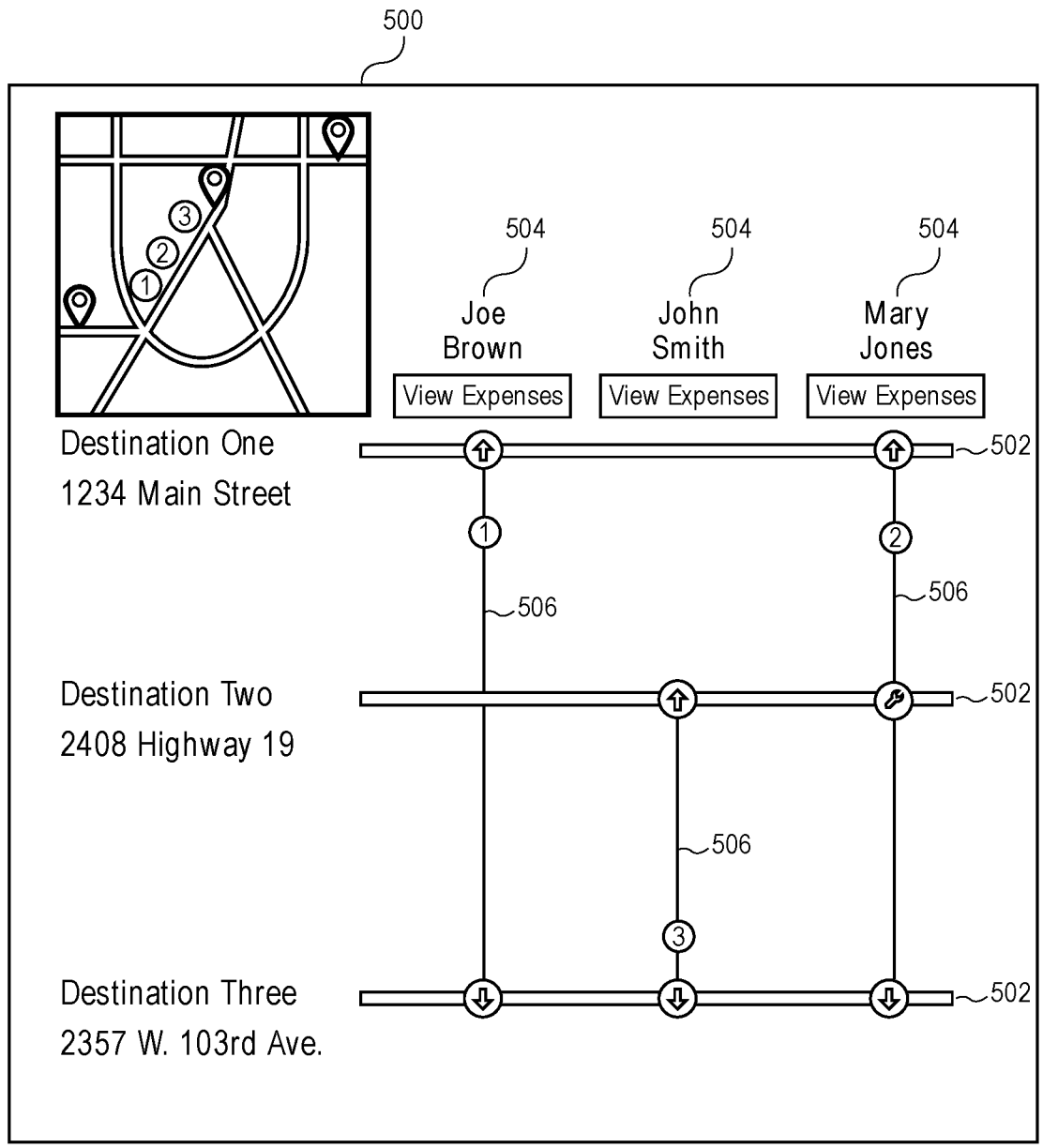
FIG. 5 depicts a trip overview and tracking page in accordance with embodiments of the invention.

FIG. 5 depicts a trip overview and tracking page in accordance with embodiments of the invention, and referred to generally by reference numeral 500. In some embodiments, page 500 may additionally be used to modify a trip once it has been created. In some embodiments, any component of the trip can be altered in real time, including vehicles, destinations, drivers, routes, and tasks. In some embodiments, changes relevant to each driver are sent to that driver in real time. For example, if the destination for a particular vehicle is changes after a trip has begun, the driver of that vehicle can be notified of the new destination and provided with a new route while they are en route.

As shown, page 500 depicts each location that is part of the trip as a horizontal row 502, and each driver as a vertical column 504. Each row 502 may include information relating to the destination itself (such as, for example, the address, a hyperlink to a map for the location or the map itself, and any special instructions for the location) together with an indication of what, if any, action the driver should be undertaking at that location. For example, each vehicle may be represented by a vertical line 506 running from the pick-up point to the drop-off point in the column corresponding to the driver assigned to that vehicle. In some embodiments, the tasks for each vehicle at each locations may be indicated on the line as well. For example, if a vehicle is to be picked up at a first location, driven to a second location for paintless dent repair, not stop at a third location, and dropped off at a fourth location, this may be represented by the line for that vehicle beginning with an open circle in the row for the first location, passing through a wrench icon in the row corresponding to the second location, passing through the row for the third location with no icon, and terminating in a closed circle in the row for the fourth location. Of course, alternate sets of iconography are also contemplated, but page 500 allows the user to quickly grasp the tasks assigned to each driver at each location.

In some embodiments, additional information regarding the tasks assigned to each driver are available by clicking on or hovering over the icon for the driver in the row for the corresponding location. In some embodiments, basic tasks (such as drop off and pick up) case be specified by clicking the pick-up location in the column for a particular driver and dragging to the drop-off location. In some embodiments, predetermined tasks available to be performed at a location are specified when adding the location to the trip. For example, a dealership may have pick-up, drop-off, fueling, and repair tasks available, while an auction lot may have only pick-up tasks available. In other embodiments, arbitrary tasks may be specified by the user creating the trip. In still other embodiments, tasks (of whatever type) are specified by the user on page 500 after the basic trip has been created. In this way the tasks needed for each vehicle at each location can be specified.

Once the locations, tasks, vehicles, and driver have been specified by the user, page 500 provides the user with a way to quickly view the trip at-a-glance. As described above, the user can also use page 500 to modify the trip in real time, thereby causing affected drivers to be notified, also in real time. In some embodiments, page 500 may also provide estimated times for the drivers to reach each location based on the specified start time for the trip and estimated driving times for each segment of the trip. In some embodiments, these estimates may be updated in real time using tracking information (e.g., tracking information provided by a smartphone of the driver or a tracking device installed in the vehicle), or based on driver-reported delays (e.g., repossession, of a vehicle to be picked up, traffic accidents, etc.). In some such embodiments, initial time estimates can be made using travel times padded based on the number of drivers, the number of cars, the number and/or types of tasks to be completed at each destination, and so on. In some such embodiments, initial time estimates may be further modified based on weather information, traffic information, completion times for prior, similar trips, etc. These initial times can then be updated as described above to provide real-time pick-up and drop-off times for each vehicle.

Other information relating to the trip can also be viewed in real time. For example, if the driver for a vehicle submits expenses (e.g., gasoline or tolls), these receipts can be viewed under the corresponding driver and/or vehicle entries in page 500. Similarly, drivers can submit photographic or video conditions reports for vehicles (such as, for example, if the vehicle has unexpected damage) using the driver's mobile app as discussed below, and these reports can be viewed in real time using page 500. In some embodiments, generating such a condition report may be a task assigned to the driver of the vehicle at the pick-up location. Alternatively, the user may be able to search for the status of a particular vehicle or driver across all trips.

Figure 6:
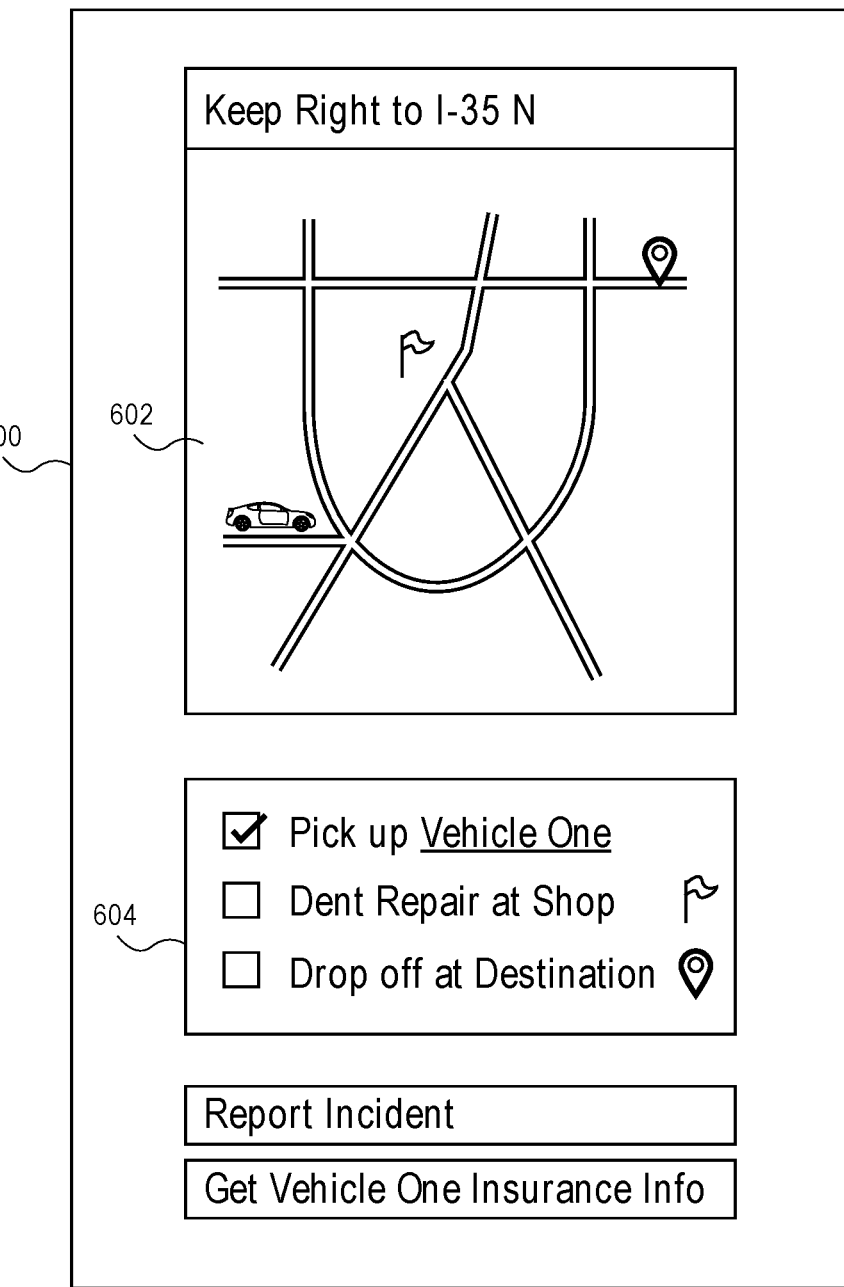
FIG. 6 depicts a driver interface in accordance with embodiments of the invention.

FIG. 6 depicts a driver interface in accordance with embodiments of the invention, and referred to broadly be reference numeral 600. Driver interface 600 may be implemented, in some embodiments, on the smartphone of a driver, and allows the driver to manage all aspects of individual trips as well as accepting bids for new trips, and submitting bills for completed trips. In some embodiments, driver interface 600 allows for real-time, two-way communication between drivers and trip requestors, by either by voice, video, messaging, or other communications channel. As described above driver interface 600 can notify the driver of received bids for trips. When the driver is conducting a trip, real-time turn-by-turn guidance can be provided using map 602.

Also provided is a checklist 604 of tasks to be completed by the driver at each location, also referred to herein as an "action sheet" for that driver. Broadly, the system of embodiments of the invention takes the component pieces of the overall itinerary and allocates them among the drivers at specific locations. In this way, driver interface 600 broadly corresponds to the driver's column of trip overview and tracking page 500. Each task may have a button for performing that task or indicating that the task has been performed. For example, a task of recording a video walkaround condition report for the car could have a button for triggering the start of video recording. A task to refuel the vehicle could include a button to provide payment information to a point-of sale or capture an image of a receipt for later reimbursement. Similarly, if a vehicle (e.g., a moving trick) is dropped off at a client's house, a button can be provided to capture the client's signature affirming that they received the vehicle. Many such tasks can be combined into an action sheet for a particular location if needed. Some tasks, such as drop off or repair tasks, may simply have a checkbox to indicate that they have been completed. Action sheets for each driver can automatically be created based on the vehicle, the location, and/or other factors of the trip. For example, an item may automatically be added to an action sheet to pick up the title (and/or other documentation) at the initial pick-up location for a vehicle. Similarly, if a vehicle is dropped off at a rail yard for further transportation via train, and action item may be automatically added to fold in the vehicle's mirrors when dropping it off. In some embodiments, "dispatch action sheets" may be available for drivers, which simply instruct the drivers to show up at an initial pick-up location for subsequent assignment (which may be verbally or via later addition of additional items to their action sheet).

As discussed above, embodiments of the invention are discussed in this specification with respect to the transportation of personal vehicles for the sake of brevity. However, the invention is applicable to many more industries, and each industry will have its own set of applicable tasks for inclusion in action sheets. For example, action sheets can be used in any industry where temporary labor is needed. In such an industry, items on an action sheet might include "report to the job site," "check out truck," "collect team members," "purchase job materials," and so on. Furthermore, additional tasks may be applicable across multiple industries, such as upselling the customers or the surveys described elsewhere.

Similarly, the system can be used for the transportation and use of heavy equipment (e.g., construction equipment such as backhoes, digger derricks, and aerial lifts, or commercial vehicles such as moving trucks or tow trucks). In such industries, action sheets might include items such as "load equipment onto trailer," "pick up escort vehicles," "transport equipment to job site," "don safety gear," and so on. Of course, in such an embodiment, when the operators of the heavy equipment (i.e., drivers as discussed elsewhere) are selected for such trip, only drivers licensed to operate the corresponding equipment are considered for selection.

Still other embodiments of the invention can be used for transporting vehicles such as airplanes. In such embodiments, existing pre-flight checklists can be incorporated into action sheets. Thus, an action sheet might include elements such as "pick up airport gate pass," "travel to airport," and "arrive at hanger" as well as traditional pre-flight checks such as "verify that ARROW documents are present," "perform aircraft walk around," "verify control rigging," etc.

Interface 600 can also provide documentation needed for the trip. For example, where the trip requestor has provided by-the-trip automobile insurance, the details of that policy can be provided to the driver via interface 600. Similarly, if a digital license plate number has been assigned to the vehicle for the trip, the plate number can be provided to the driver by interface 600 for reference or entry onto a digital license plate display. Where the trip requestor has made provision for third-party transportation (e.g., a taxi or car-sharing service) to or from the initial pick-up or final drop-off locations, driver interface 600 can be used to summon the transportation when it is needed.

When the driver is not currently engaged in a trip, driver interface 600 can provide a variety of different functionality. For example, car manufacturers may wish to survey particular demographics of driver as to their opinion of certain models of cars. Thus, for example, Ford might wish to know how male drivers 18-20 feel about the cabin interior of the 2015 F-150. Once this request is entered into the system, any drivers matching the desired demographics can be presented with the appropriate survey in interface 600 whenever they have finished transporting the corresponding vehicle.

In some embodiments, funds can automatically be transferred to driver's accounts when they indicate that they have finished a trip or once the destination signs off. This payment information can be collected for display in driver interface 600 as well, as well as exported for use by, for example, a tax professional preparing the a tax return for the driver. Similarly, the driver may be able to use interface 600 to schedule or manually indicate their availability to transport vehicles so that they only receive bids when they are prepared to work. Interface 600 can also be used by a driver to provide feedback about any aspect of the trip, including the trip requestor, the pick-up, drop-off or intermediate facilities or the vehicles being transported. When needed, interface 600 can also be used to complete certifications requested by trip creators or verify licensing information. Of course, one of skill in the art will appreciate that the functionality of interface 600 can further be adapted for use with any by-the-job employment, such as day laborers, personal assistants, etc.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for a vehicle transportation system, the method comprising:
   causing display of a first page for planning a move of vehicles, the first page operable to receive input from a user;
   receiving, from the user and in the first page, user input indicative of:
      a first vehicle;
      a pick-up location for the first vehicle;
      a first drop-off location for the first vehicle;
      a second vehicle at the first drop-off location; and
      a second drop-off location for the second vehicle;
   determining a driver for the move based on a selection from the user;
   transmitting, to a smartphone application of a smartphone associated with the driver, a request to drive for the move;
   receiving, from the driver and via the smartphone, an acceptance of the request;
   responsive to receiving the acceptance, dispatching the driver for the move;
   responsive to dispatching the driver, causing display of a second page operable to display information associated with the move; and
   updating the second page, in real time and based at least in part on a driver GPS device associated with the driver, to reflect the driver traveling between the pick-up location, the first drop-off location, and the second drop-off location,
   wherein the second page is configured as a map interface for displaying a location of the driver during the move.

2. The media of claim 1, wherein transmitting the request to drive for the move comprises:
   causing display of, on the smartphone of the driver, a third page operable to display:
      an address for the pick-up location; and
      at least one button operable to receive the acceptance of the move from the driver.

3. The media of claim 1, wherein determining the driver based on the selection from the user comprises:
   determining a pool of available drivers;
   causing display of, to the user, at least a subset of the pool of the available drivers; and
   receiving from the user, the selection of the driver from the pool of the available drivers.

4. The media of claim 3, wherein the pool of the available drivers is determined based on a self-reported availability received from a plurality of drivers.

5. The media of claim 1, wherein the first page is further operable to receive additional user input indicative of at least one of a vehicle identification number (VIN) or a vehicle transmission type.

6. The media of claim 1, wherein the first page is further operable to receive additional user input indicative of at least one of an instruction or a note for the move.

7. The media of claim 1, wherein the driver is covered by a temporary insurance policy for a duration of the move.

8. A method for vehicle transportation, the method comprising:
  causing display of a first page for planning a move of a vehicle, the first page operable to receive input from a user;
  receiving, from the user and in the first page, user input indicative of:
    the vehicle;
    a first search for a pick-up location for the vehicle; and
    a second search for a drop-off location for the vehicle;
  determining a driver for the move based on a location of the driver determined from a driver GPS device associated with the driver;
  dispatching the driver for the move;
  responsive to dispatching the driver for the move, causing display of a second page operable to display information associated with the move; and
  updating the second page, in real time and based at least in part on the location of the driver determined from the driver GPS device, to reflect the driver traveling from the pick-up location to the drop-off location,
  wherein the second page is configured as a map interface for displaying the location of the driver during the move.

9. The method of claim 8, further comprising:
  transmitting, to a smartphone application of a smartphone associated with the driver, a request to drive for the move; and
  receiving, from the driver and via the smartphone, an acceptance of the request,
  wherein the driver is dispatched for the move responsive to receiving the acceptance.

10. The method of claim 8, further comprising:
  determining that a return trip modality for the driver is a ride share return trip; and
  responsive to determining that the return trip modality is the ride share return trip, automatically scheduling the ride share return trip for the driver.

11. The method of claim 8, wherein determining the driver for the move is further based on a self-reported availability of the driver.

12. The method of claim 8, further comprising receiving, from the driver, at least one of a pre-trip inspection report or a post-trip inspection report.

13. The method of claim 8, further comprising:
  storing the user input indicative of the vehicle;
  receiving additional user input for a second move from the user; and
  autosuggesting the vehicle to the user.

14. The method of claim 8, wherein the vehicle is a first vehicle, the drop-off location is a first drop-off location, and wherein the user input is further indicative of:
  a second vehicle at the first drop-off location; and
  a second drop-off location for the second vehicle.

15. The method of claim 8, further comprising:
  transmitting a SMS message to the driver indicative of the move,
  wherein the driver is dispatched responsive to receiving acknowledgement of the SMS message.

16. A system for vehicle transportation comprising one or more non-transitory computer-readable media storing computer-executable instructions that, when executed by at least one processor, execute instructions, comprising:
  causing display of a first page for planning a move of a vehicle, the first page operable to receive input from a user;
  receiving, from the user and in the first page, user input indicative of:
    the vehicle;
    a pick-up location for the vehicle; and
    a drop-off location for the vehicle;
  automatically determining a driver for the move;
  transmitting, to a smartphone application of a smartphone associated with the driver, a request to drive for the move;
  receiving, from the driver and via the smartphone, an acceptance of the request;
  responsive to receiving the acceptance, dispatching the driver for the move;
  responsive to dispatching the driver, causing display of a second page operable to display information associated with the move;
  updating the second page, in real time and based at least in part on a driver GPS device associated with the driver, to reflect the driver traveling from the pick-up location to the drop-off location;
  determining that a return trip modality for the driver is a ride share return trip; and
  responsive to determining that the return trip modality is the ride share return trip, automatically scheduling the ride share return trip for the driver.

17. The system of claim 16, wherein the instructions further comprise:
  causing display of, on the smartphone of the driver, a third page operable to display at least a subset of the information associated with the move.

18. The system of claim 16, wherein the instructions further comprise:
  receiving, from the driver, submission of a driver report for the move.

19. The system of claim 16, wherein the second page is configured as a map interface that reflects the driver traveling from the pick-up location to the drop-off location.

20. The system of claim 16, wherein the driver is automatically determined from a pool of available drivers determined based at least in part on a self-reported availability received from a plurality of drivers.

21. The system of claim 16, wherein the vehicle is a first vehicle, the drop-off location is a first drop-off location, and wherein the user input is further indicative of:
  a second vehicle at the first drop-off location; and
  a second drop-off location for the second vehicle.

22. The system of claim 16,
  wherein receiving the pick-up location from the driver comprises receiving a first search of the pick-up location from the user, and
  wherein receiving the drop-off location for the move from the driver comprises receiving a second search of the drop-off location from the user.

* * * * *